Dec. 4, 1951 K. F. GALLIMORE 2,577,517
MACHINE TOOL

Filed Sept. 16, 1947 13 Sheets-Sheet 1

Fig. 1

INVENTOR
Keith F. Gallimore
By Bair, Freeman, Molsberry & Wolfe.
ATTORNEYS

Fig. 8

Dec. 4, 1951      K. F. GALLIMORE      2,577,517
MACHINE TOOL

Filed Sept. 16, 1947      13 Sheets-Sheet 8

Patented Dec. 4, 1951

2,577,517

UNITED STATES PATENT OFFICE 2,577,517

MACHINE TOOL

Keith F. Gallimore, Fond du Lac, Wis., assignor to Giddings & Lewis Machine Tool Company, Fond du Lac, Wis., a corporation of Wisconsin Application September 16, 1947, Serial No. 774,307

7 Claims. (Cl. 29—26)

The invention relates to machine tools generally, and more particularly to machines of the type commonly known as horizontal boring, drilling and milling machines.

One object of the invention is to increase the flexibility and versatility of machines of the above general character to adapt them for the efficient and accurate performance of a wider variety of machining operations.

Another object is to provide a machine of the type indicated in which the normally independent feeding movements of a translatable machine element, such as a work support, and a tool carrying element, such as a rotary spindle, may be coordinated to adapt the machine for precision thread cutting in addition to the usual boring, drilling and milling operations.

Another object is to provide improved drive mechanism for machine tools which affords a wide range of speeds and which is quickly and easily adjustable by simple, conveniently operable manual control means.

Still another object is to provide improved coupling means for operatively connecting and disconnecting a translatable machine element and its associated feed screw.

A further object is to provide improved means for taking up the lost motion between a translatable machine element and its associated feed screw so as to eliminate backlash and thus insure greater accuracy in the positioning of the element.

It is also an object of the invention to improve the general construction of the machine whereby to provide more rigid support for the spindle head, to provide for efficient disposal of the metal chips removed from the work while effectually shielding the drive and feed elements of the machine from such chips or other foreign material, to provide an improved outboard support for a boring bar which is readily removable so as not to interfere with other machining operations, and to provide efficient, readily accessible means for clamping a translatable machine element in fixed position.

Other objects and advantages of the invention will become apparent from the following detailed description of the preferred embodiment illustrated in the accompanying drawings, in which.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 1:
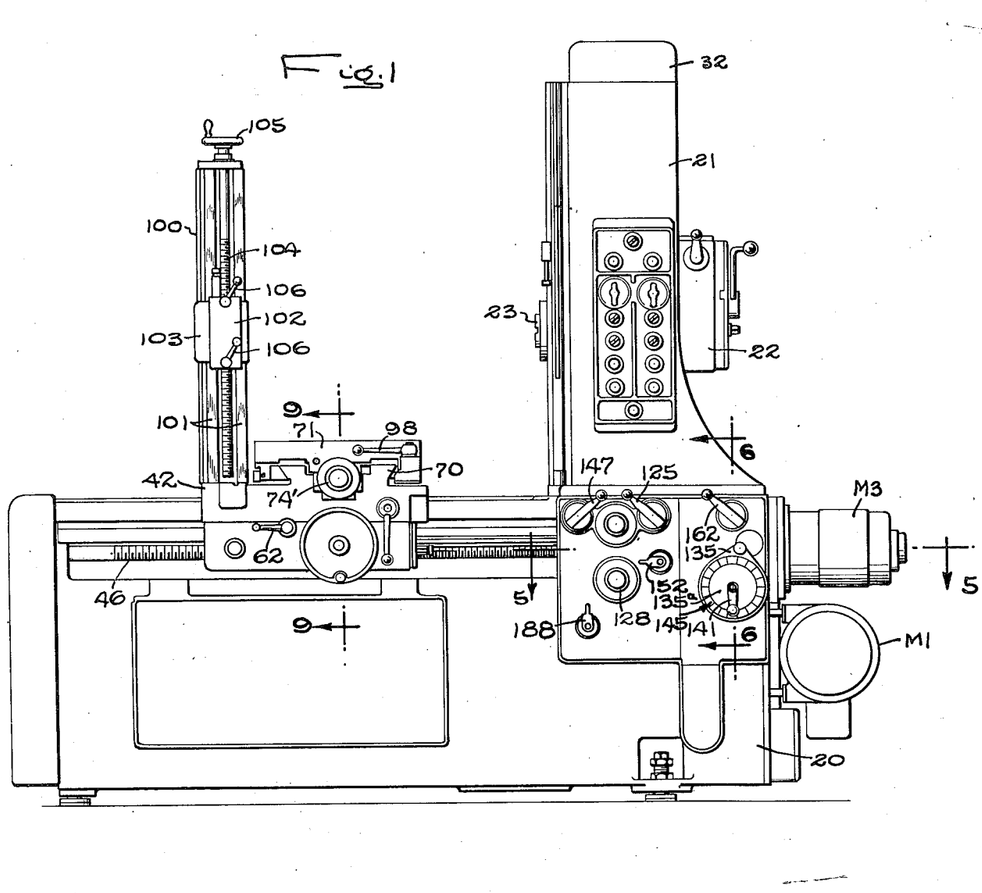
Figure 1 is a front elevation of a machine tool embodying the features of the invention.
Figure 2:
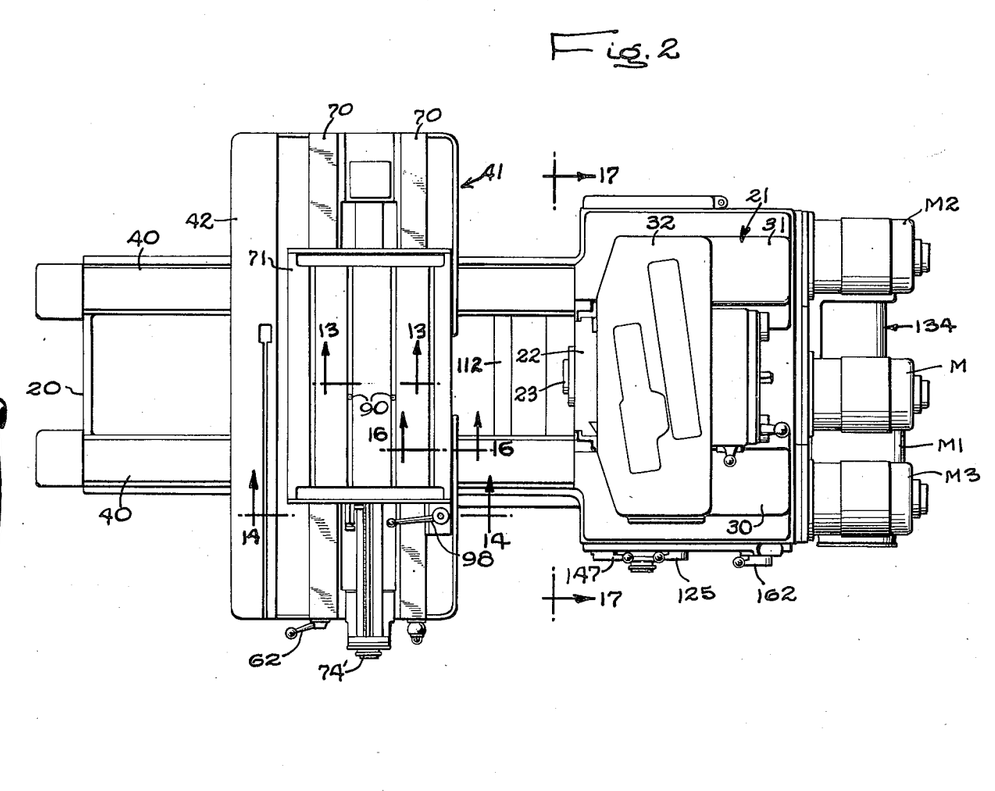
Fig. 2 is a plan view of the machine.
Figure 3:
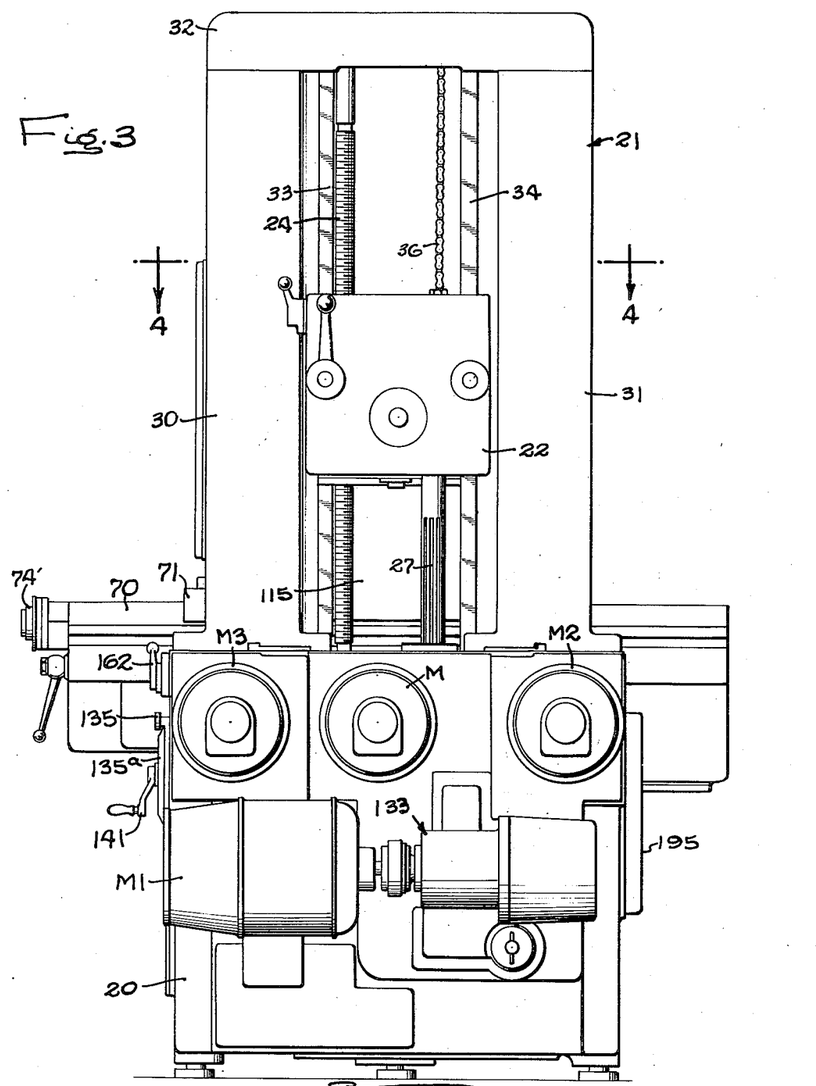
Fig. 3 is an elevational view of the machine as viewed from the right end of Fig. 1.

Referring to Figs. 1-3 of the drawings, the machine selected to illustrate the invention comprises generally an elongated bed 20 having an upright column 21 adjacent one end. The column 21 is arranged to support a headstock 22 in which is journaled a tool supporting spindle 23 along with the usual change speed gearing G. Adjustable support for the headstock is provided by a feed screw 24 extending along the column 21 and coacting with a stationary nut 25 (Fig. 18) carried by the headstock. The feed screw is rotatably anchored at its upper end on the column 21 and its lower end extends into a gear box 26 (Fig. 5) formed in the machine bed below the column 21. This gear box houses the feed and drive mechanisms for the various machine elements described in detail hereinafter. A splined drive shaft 27 also extends from the gear box 26 along the column for driving the spindle 23.

Figure 4:
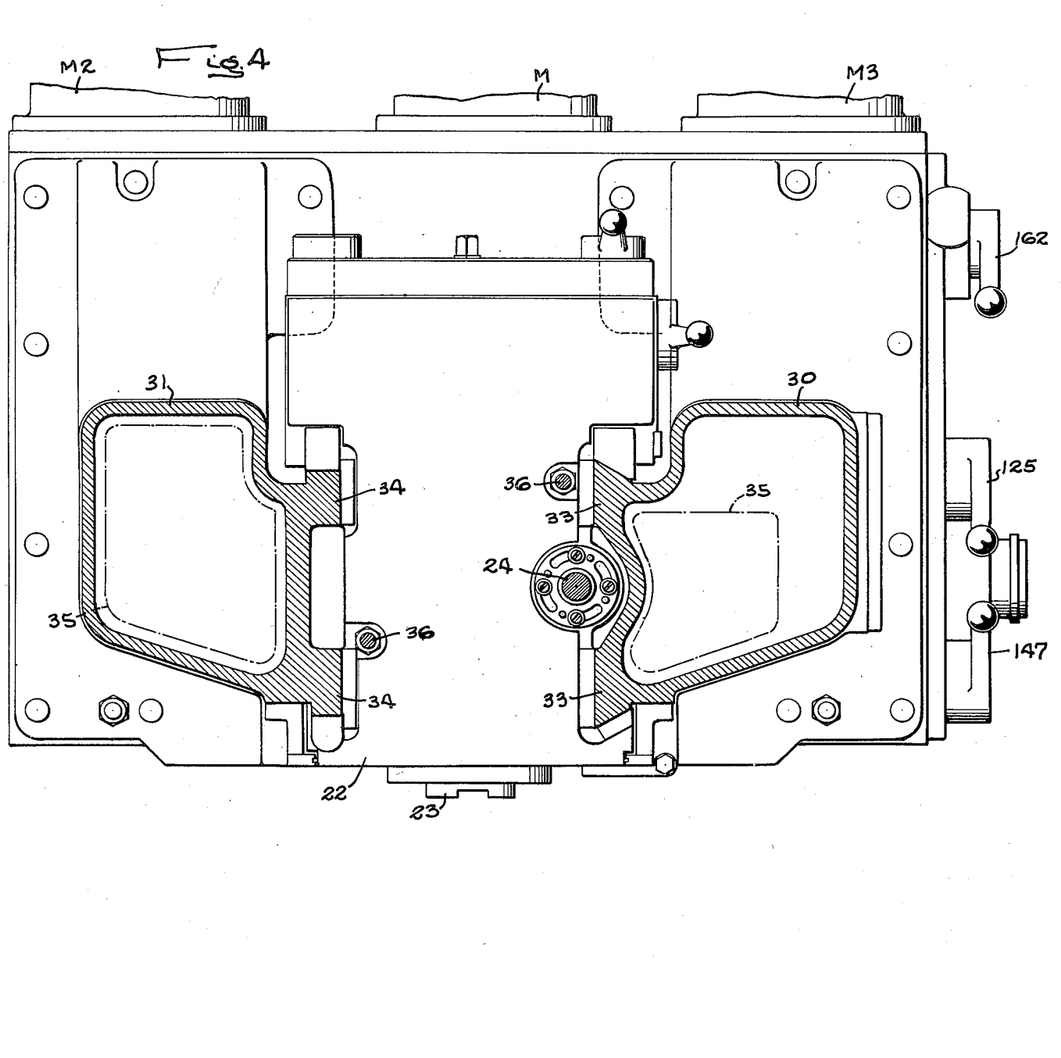
Fig. 4 is a transverse sectional view of the machine column taken in a horizontal plane substantially on the line 4—4 of Fig. 3.

To insure accurate alinement of the headstock 22 and to provide rigid support therefor, the column 21 is preferably formed with two parallel vertical standards 30 and 31 (Figs. 3 and 4) having their lower ends bolted or otherwise secured to the top of the bed 20 and integrally joined at their upper ends by a cross member or cap 32. The standards 30 and 31 are spaced apart to receive the headstock 22 between them and one standard, in this instance the standard 30, is formed on its inner side with vertically disposed dovetailed ways 33 cooperating with complemental way-engaging elements on the adjacent side of the headstock. The other standard 31 is formed on its inner side with flat ways 34 which coact with suitable way-engaging elements on the adjacent side of the headstock to resist lateral movements of the headstock while preventing binding on the ways incident to temperature changes. In the present instance, the standards 30 and 31 are of hollow construction and serve as housings for suitable counterweights 35 connected with the headstock 22 in the usual manner by chains 36 running over sheaves (not shown) journaled in the cap 32.

The top of the bed 20 in front of the working face of the headstock 22 is provided with parallel longitudinal ways 40 (Fig. 2) supporting and guiding a reciprocable carriage 41 adapted to present the work to the tool carried by the spindle 23. Preferably, the carriage 41 comprises a saddle 42 having spaced parallel guide rails 43 (Fig. 9) projecting from its underside for engagement with the ways 40. The ways, in this instance, are recessed in the top of the bed 20 and one way is fitted with a gib plate 44 engaging the side of the associated rail 43 to guide the saddle in its movements on the ways.

The saddle 42 is adapted to be traversed along the ways 40 by a feed screw 46 extending longitudinally of the machine bed and cooperating with novel coupling means 47 carried by the saddle. The feed screw 46 is rotatably anchored at its outer end on the machine bed and its other end extends into the gear box 26 for connection with the feed mechanisms housed therein, as will appear presently.

Figure 9:
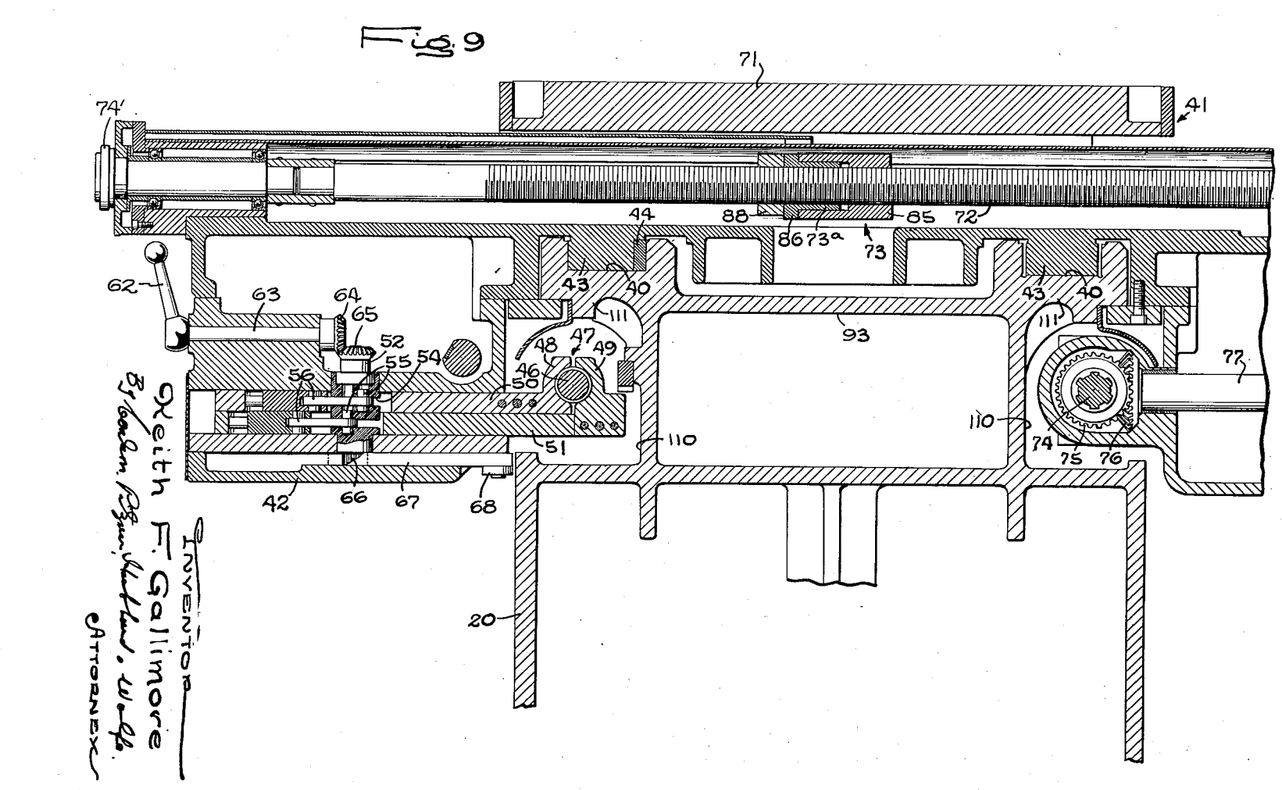
Fig. 9 is a sectional view of the carriage taken in a vertical plane substantially on the line 9—9 of Fig. 1.
Figures 10, 11:
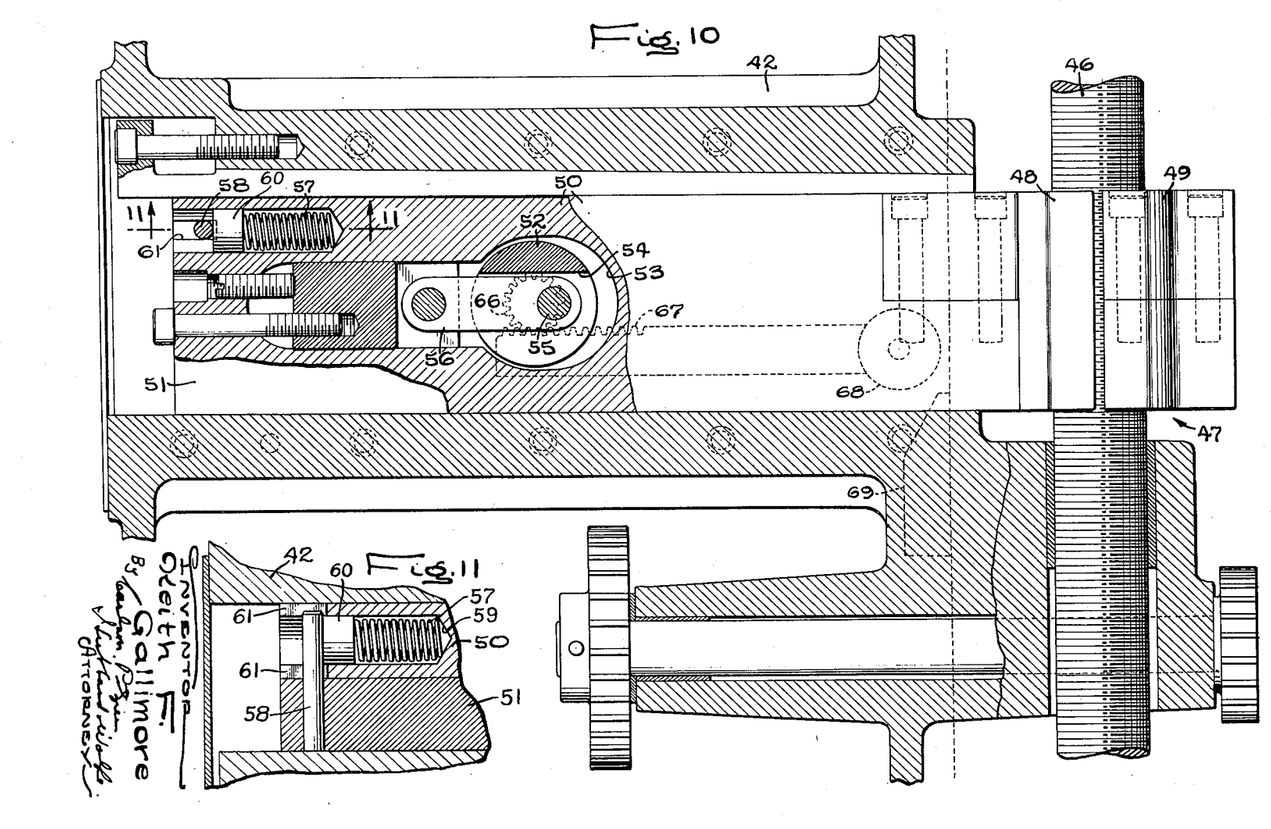
Fig. 10 is a fragmentary horizontal sectional view of the carriage feed mechanism shown in Fig. 9.
Fig. 11 is a fragmentary sectional view taken in a horizontal plane substantially on the line 11—11 of Fig. 10, showing details of the spring return for the coupling mechanism.

As shown in Figs. 9 and 10, the coupling means 47 comprises a pair of half nut elements 48 and 49 disposed on opposite sides of the feed screw 46 and mounted respectively on slides 50 and 51 supported on the saddle one above the other for movement transversely of the feed screw. For shifting the slides to engage or disengage the nut elements and the feed screw, a rotary actuator, herein shown as a shaft 52, is journaled on the saddle so as to project through clearance apertures 53 in the slides. The intermediate portion of the shaft is formed with a pair of oppositely facing relatively deep recesses 54 substantially alined with the respective slides and in which are mounted crank pins 55 having their axes parallel with but eccentric to the rotational axis of the shaft 52. Links 56 connect the crank pins 55 to the slides 50 and 51. Since the crank pins are located on diametrically opposite sides of the shaft axis, the slides are shifted simultaneously but in opposite directions upon rotation of the shaft.

The slides 50 and 51 are yieldably urged to nut engaging positions by a coiled compression spring 57 interposed between the slide 50 and a pin 58 rigid with the slide 51. As shown in Figs. 10 and 11, the spring 57 is seated in a recess 59 in the outer end of the slide 50 and a plug 60 is interposed between the outer end of the spring and the pin 58. Slots 61 are formed in the end of the slide 50 to accommodate the pin. With this arrangement, the spring 57 acts directly on the slides 50 and 51 to urge them and the associated nut elements 48 and 49 toward the feed screw 46.

Manually operable means is provided for rotating the shaft 52 to withdraw the nut elements 48 and 49 from engagement with the feed screw 46. The manual means as herein shown comprises a hand lever 62 fast on a shaft 63 journaled in the saddle 42 and projecting at the front end thereof. Bevel gears 64 and 65 keyed to the shafts 63 and 52 provide a driving connection therebetween.

Means is also provided for automatically shifting the slides 50 and 51 to nut disengaging positions when the saddle 42 is traversed to predetermined positions on the ways 40, as, for example, the limit positions at the ends of the ways. For this purpose the actuator shaft 52 is provided at its lower end with a pinion 66 meshing with the teeth on a rack member 67 slidably supported on the saddle 42 for movement transversely of the ways 40. At its inner end the rack member 67 carries a follower roller 68 adapted to coact with suitable cams 69 secured to the sides of the machine bed 20. In practice the cams are located so as to effect disengagement of the nut as the saddle approaches the ends of the ways 40, thus preventing over-travel of the saddle and possible damage to the driving mechanism.

Figure 14:
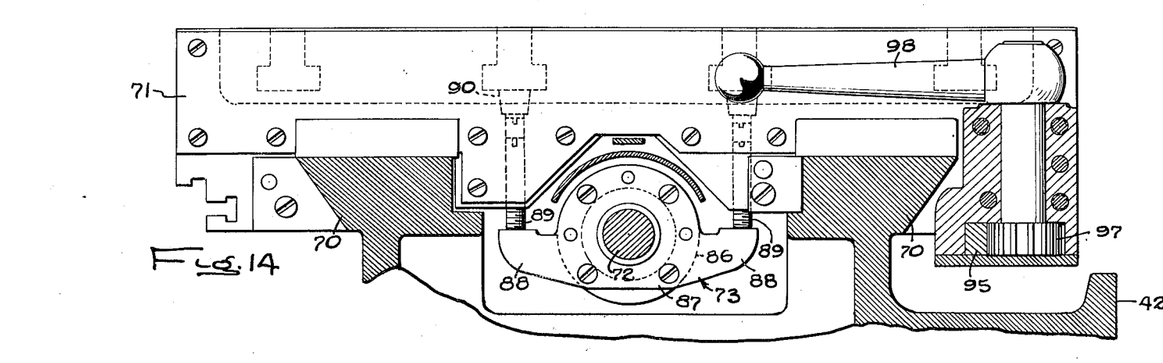
Fig. 14 is a transverse sectional view of the table taken in a plane substantially on the line 14—14 of Fig. 2.
Figure 15:
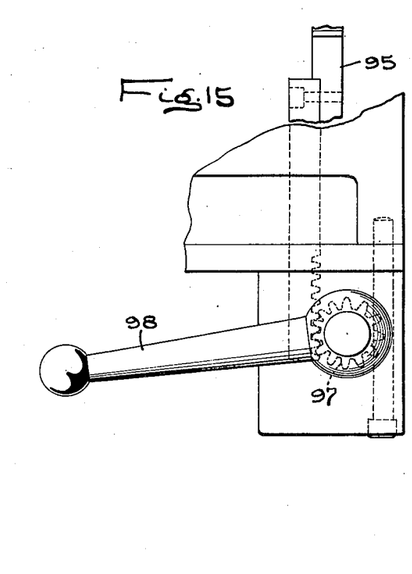
Fig. 15 is a fragmentary plan view of the table clamp mechanism.

As shown in Figs. 2 and 14, the top of the saddle 42 is formed with parallel horizontal ways 70 on which a worktable 71 is slidably supported for movement transversely of the machine bed. For traversing the table on the ways 70, a feed screw 72 is disposed longitudinally of the saddle and arranged to coact with a fixed nut 73 (Figs. 9, 12 and 14) carried by the table 71. The feed screw is adapted to be rotated manually or by power, the power drive including a splined drive shaft 74 extending longitudinally of the machine bed 20 from the gear box 26. For manual rotation, the feed screw is extended to the front end of the saddle 42 and is provided with suitable coupling means 74' for engagement by a hand crank (not shown).

A driving connection between the shaft 74 and the feed screw 72 is maintained in all positions of the saddle 42 by an internally splined bevel gear 75 (Figs. 9 and 18) rotatably anchored on the saddle and having a slidable driving connection with the shaft. The gear 75 meshes with a bevel gear 76 keyed to a shaft 77 journaled on the saddle and provided with an axially slidable clutch gear 78 (Fig. 18) shiftable into or out of driving engagement with an intermediate gear 79 which meshes with a pinion 80 fast on the inner end of the feed screw 72. The clutch gear is adapted to be shifted in any suitable manner, as by a hand lever 81 conveniently mounted on the saddle 42 and connected by a link 82 (Fig. 18) with a shifter lever 83 pivotally supported on the saddle.

Figures 12, 13:
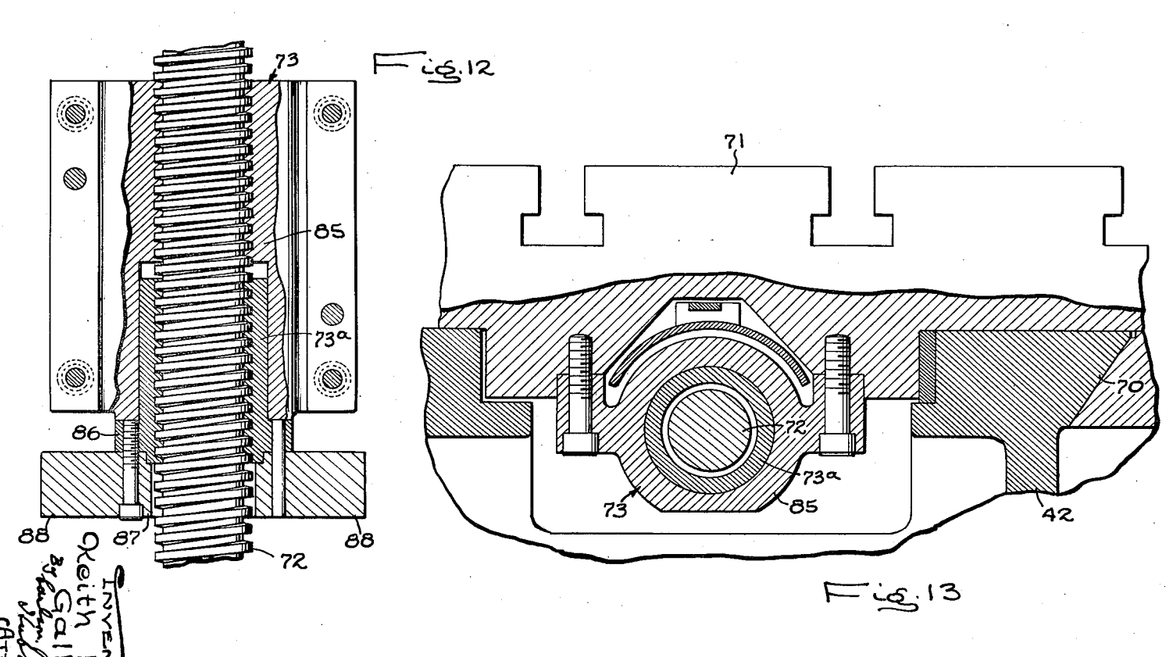
Fig. 12 is a fragmentary sectional view of the underside of the table showing the feed nut and the structure for supporting the same.
Fig. 13 is a sectional view of the table taken in a plane substantially on the line 13—13 of Fig. 2 showing the feed nut adjusting means in elevation.

Means is provided for taking up lost motion between the feed screw 72 and nut 73 to eliminate backlash between the parts and thus insure accurate positioning of the table by the feed screw. For this purpose the nut 73 is constructed in two parts, one part 85 being rigidly secured to the underside of the table 71. The other part of the nut 73 is constructed in the form of a cylinder 73a rotatably supported in an axial recess in the part 85 (Figs. 12 and 14). To adjust for wear, the part 73a is rotated relative to the part 85, thus acting in the manner of a lock nut to eliminate any lost motion between the interengaging screw threads. To maintain the nut parts in adjusted position, the part 73a is provided at one end with a circumferential flange 86 to which is secured a collar 87 having two diametrically projecting arms 88 engageable respectively with locking screws 89 threaded into recesses in the table 71 and projecting from the underside thereof. The screws 89 may have their upper ends appropriately formed for engagement by a wrench or other tool so that they may be screwed in or out to determine the angular position of the collar 87 and the nut part 73a to which it is secured. To provide access to the screws for such adjustment or for replacement, the recesses in which they are mounted are preferably extended so as to open through the top of the table 71. Plugs 90 are seated in the open ends of the recesses to keep out metal chips and other foreign material.

Figure 16:
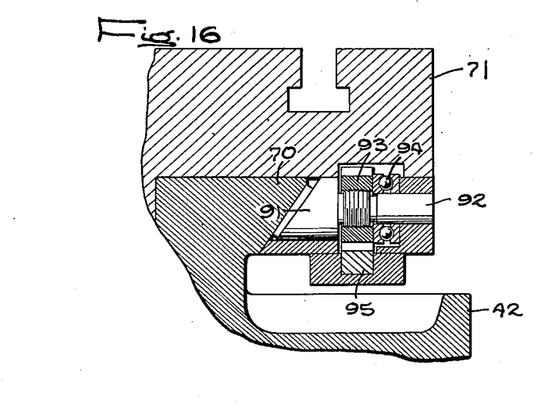
Fig. 16 is a vertical sectional view of the table clamping mechanism taken in a plane substantially on the line 16—16 of Fig. 2.

Provision is made for frictionally clamping the table 71 in its various adjusted positions on the saddle 42. As herein shown the clamping means comprises a clamping member 91 (Fig. 16) slidably mounted in a recess in a depending side flange in the table for movement toward and from the way 70 at that side of the table. The inner face of the member 91 is beveled for cooperation with the adjacent undercut face of the way, as shown in the drawing. Projecting from the opposite face of the clamping member is a pin 92 threaded intermediate its ends for cooperation with a rotatable nut 93. The nut is held against axial movement in an outward direction by an antifriction bearing 94 disposed so as to take the thrust of the clamping member against the way.

The clamping member 91 is preferably located approximately at the center of the table 71 so as to reduce strains on the table and ways and to assist in maintaining the table square with the ways. For convenience of operation, means is provided whereby the clamping member may be actuated from one side of the machine to clamp or release the table. To this end the nut 93 is formed with external gear teeth adapted to mesh with the teeth of a rack 95 slidably supported on the table 71 for endwise movement. At its outer end the rack 95 is formed with teeth meshing with a pinion 97 journaled on the table 71 closely adjacent its forward end. The shaft may be rotated by means of a hand lever 98 fixed on the projecting end of the shaft.

The saddle 42 is also adapted to carry an upright column 100 (Figs. 1 and 2) to provide outboard support for a boring bar or the like mounted on and driven from the spindle 23. To provide space for the accommodation of the column, the ways 70 for the table 71 are set off to one side of the saddle, that is, toward the side facing the headstock as shown in Figs. 1 and 2. Preferably the column is removably secured to the saddle in any suitable manner so that it can be dismounted when other machining operations are to be performed.

As will be seen by reference to Fig. 1 of the drawings, the column 100 is provided on its front face with parallel vertical ways 101 for a conventional end support block 102 having the usual bushing 103 for rotatably receiving the end of the boring bar. Vertical adjustment of the end block 102 on the ways 101 is effected by means of a vertically disposed feed screw 104 rotatably anchored at its upper end on the column and provided with a hand wheel 105 by which it may be turned. The end block may be provided with the usual clamps for locking it in adjusted position on the ways, the clamps being actuated by hand levers 106.

Figure 17:
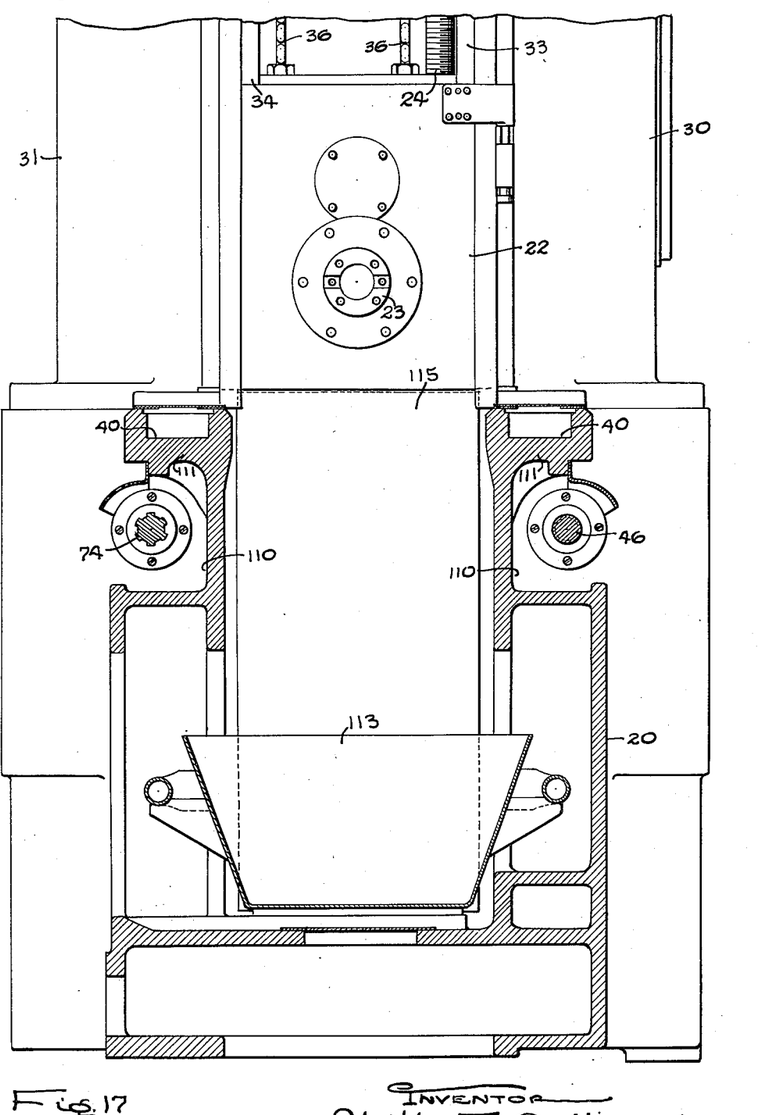
Fig. 17 is a transverse section through the machine bed taken in a vertical plane substantially on the line 17—17 of Fig. 2.

To provide for convenient chip disposal and to prevent deposit of chips on the saddle feed screw 46 and table drive shaft 74, the side walls of the machine bed 20 are preferably formed with recessed outwardly opening longitudinal compartments 110 for the accommodation of the fed screw and the shaft, as shown in Figs. 9 and 17. These compartments underlie integral longitudinal flanges 111 on the walls of the machine bed and the ways 40 are conveniently formed in such flanges. The top of the bed may therefore be left open except for reinforcing cross members 112 (Fig. 2), so that the chips removed from the work may fall into the bed for collection in suitable chip pans, such as the pan 113 shown in Fig. 17.

The location of the saddle feed screw 46 and the table drive shaft 74 externally of the side walls of the base as above described, is also advantageous in providing clearance for a chip shield 115 (Fig. 17) carried by the headstock 22.

The shield 115 as shown comprises a generally rectangular metal plate secured to the lower forward edge of the headstock 22 and movable vertically therewith. When the headstock is in its lower position, the shield is received within the open base 20, as shown in the drawing. When the headstock is elevated, the shield rises with it and closes off the lower portion of the column 21 between the uprights 30 and 31 and thus prevents the deposit of metal chips thereon.

In accordance with the invention the improved machine tool is equipped with drive and feed mechanisms which afford an exceptionally high degree of flexibility as regards feeds and speeds, and thus adapt the machine for the efficient and accurate performance of a wide variety of different machining operations. Maximum flexibility is obtained by providing a separate individual drive motor for each machine element, preferably a reversible electric motor of the variable speed direct current type. Moreover, each motor has associated with it a speed change transmission affording two or more different speed ranges. These individual drives allow the feeds and speeds to be adjusted for most efficient performance of such operations as boring, drilling and milling workpieces of widely varying sizes and character. To adapt the machine for thread cutting, provision is made for shifting the drive for the saddle feed screw 46 from its associated individual drive mechanism to the drive mechanism for the spindle 23 whereby the feed rate of the saddle is accurately coordinated with the rotation of the spindle.

Figure 5:
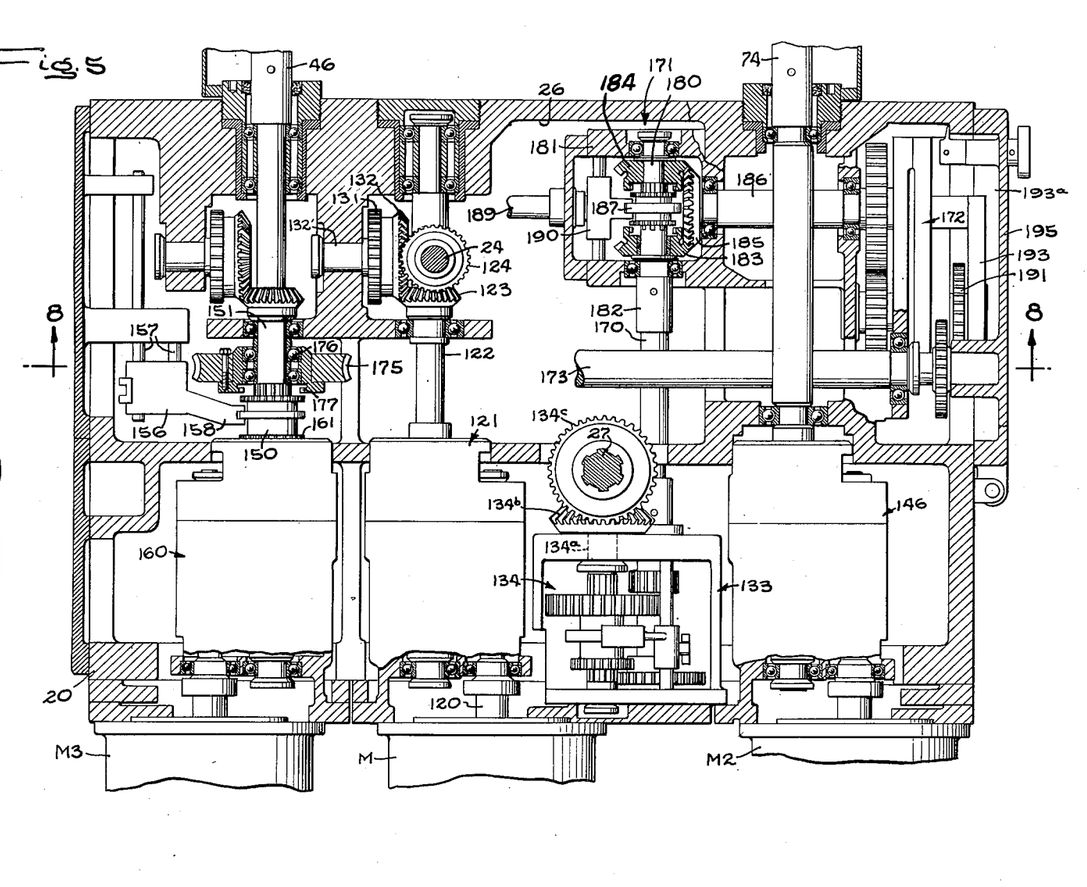
Fig. 5 is a sectional view of the machine bed taken in a horizontal plane substantially on the line 5—5 of Fig. 1.
Figure 18:
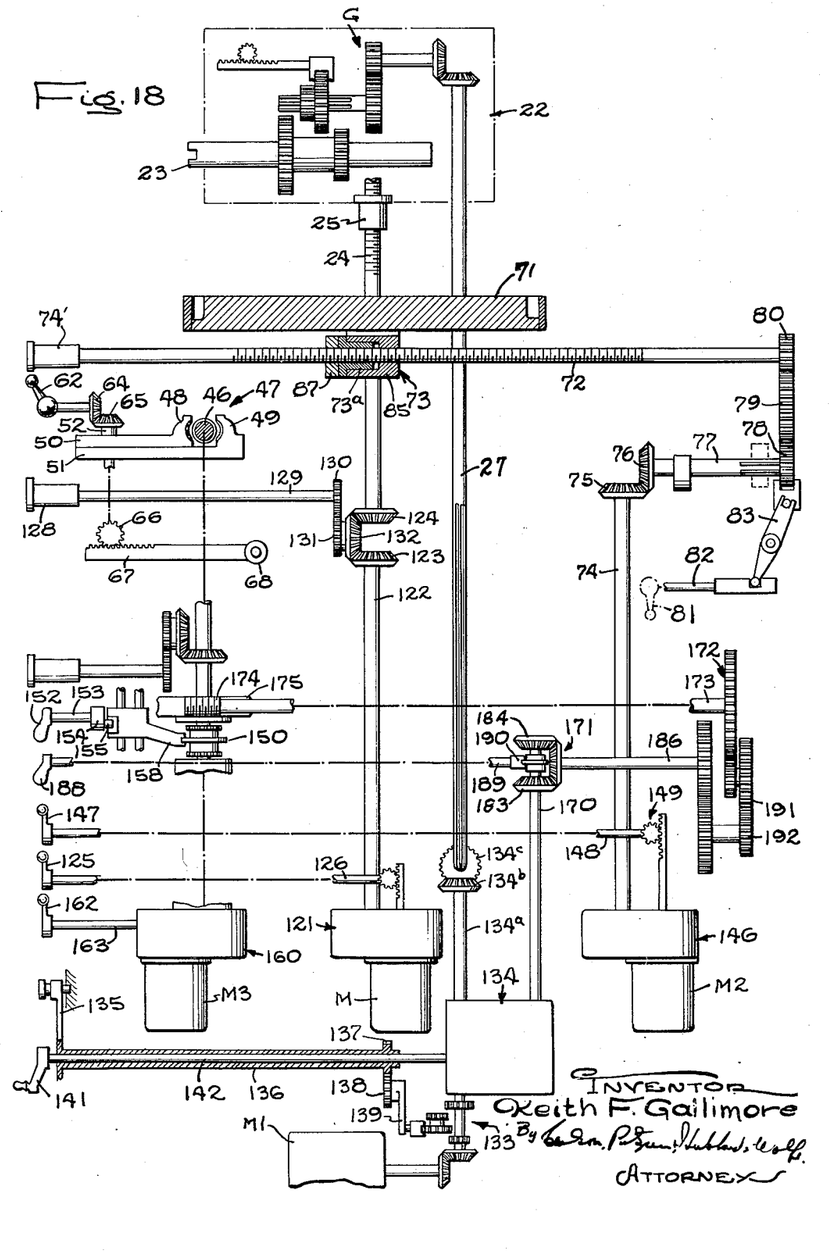
Fig. 18 is a diagrammatic view of the drive and feed mechanisms of the machine and the controls therefor.

Referring now to Figs. 5 and 18 of the drawings, the individual drive for the headstock elevator screw 24 includes a reversible electric motor M, herein shown as flange-mounted on the end of the machine bed 20 adjacent the column 21. The motor shaft 120 projects into the gear box 26 in the bed and is connected through a multiple speed transmission 121 with a horizontal shaft 122 journaled in the gear box. This shaft carries a bevel gear 123 meshing with a bevel gear 132, in turn, meshing with a bevel gear 124 keyed to the lower end of the feed screw 24.

The transmission 121 may be of any preferred type capable of being set to provide two or more speed ranges or to interrupt the drive for the shaft 122. Setting of the transmission is effected from the front of the machine by a hand lever 125 (Figs. 1 and 18) carried on a rockshaft 126 operatively connected with the transmission by a rack-and-pinion mechanism 127. With the power drive disengaged, the elevator screw 24 may be rotated manually to raise or lower the headstock 22 by means of a hand crank (not shown) engaged in a clutch 128 on the outer end of a shaft 129 journaled in the gear box 26 and projecting at the front of the machine. At its inner end the shaft 129 has a pinion 130 meshing with a spur gear 131 rigid with the bevel gear 132 which is rotatably supported on a stub shaft 132' and which meshes with the bevel gear 123, as before explained.

The individual drive for the spindle 23 includes an electric motor $M^1$ suitably supported at the column end of the bed 20 and connected through a set of back gears 133 (Figs. 6 and 18) and a multiple speed transmission 134 with a horizontal shaft 134a. The latter shaft has a bevel gear 134b meshing with a bevel gear 134c journaled in the gear box 26 and internally splined for slidably receiving the spindle drive shaft 27.

In the exemplary machine, the controls for the back gears 133 and transmission 134 are closely grouped for convenient manipulation by the attendant and to provide an accurate visual indication of the spindle speed range for the various joint settings of the back gears and the transmission. As herein shown, the back gears 133 are adapted to be set or adjusted by a rotatable disk-like member 135 supported at the front of the machine bed by a tubular rockshaft 136 journaled in the gear box 26. At its inner end the shaft 136 is provided with a pinion 137 meshing with a gear 138 rigid with a shifter arm 139 adapted to shift the movable element of the back gears between either of two active positions and a neutral position.

Figures 6, 7:
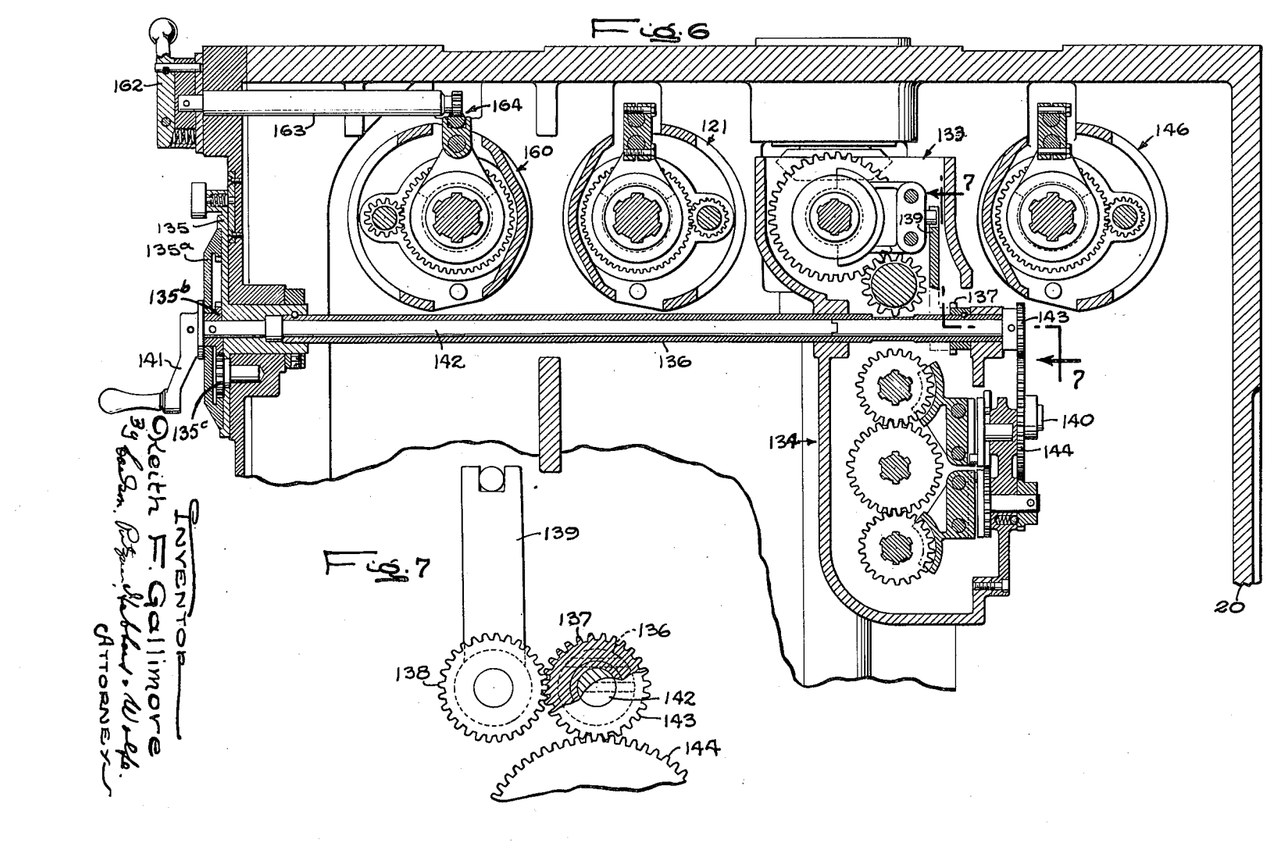
Fig. 6 is a transverse sectional view of the machine bed taken in a vertical plane substantially on the line 6—6 of Fig. 1.
Fig. 7 is a fragmentary sectional view taken in a vertical plane substantially on the line 7—7 of Fig. 6, showing details of the gearing.
Figure 8:
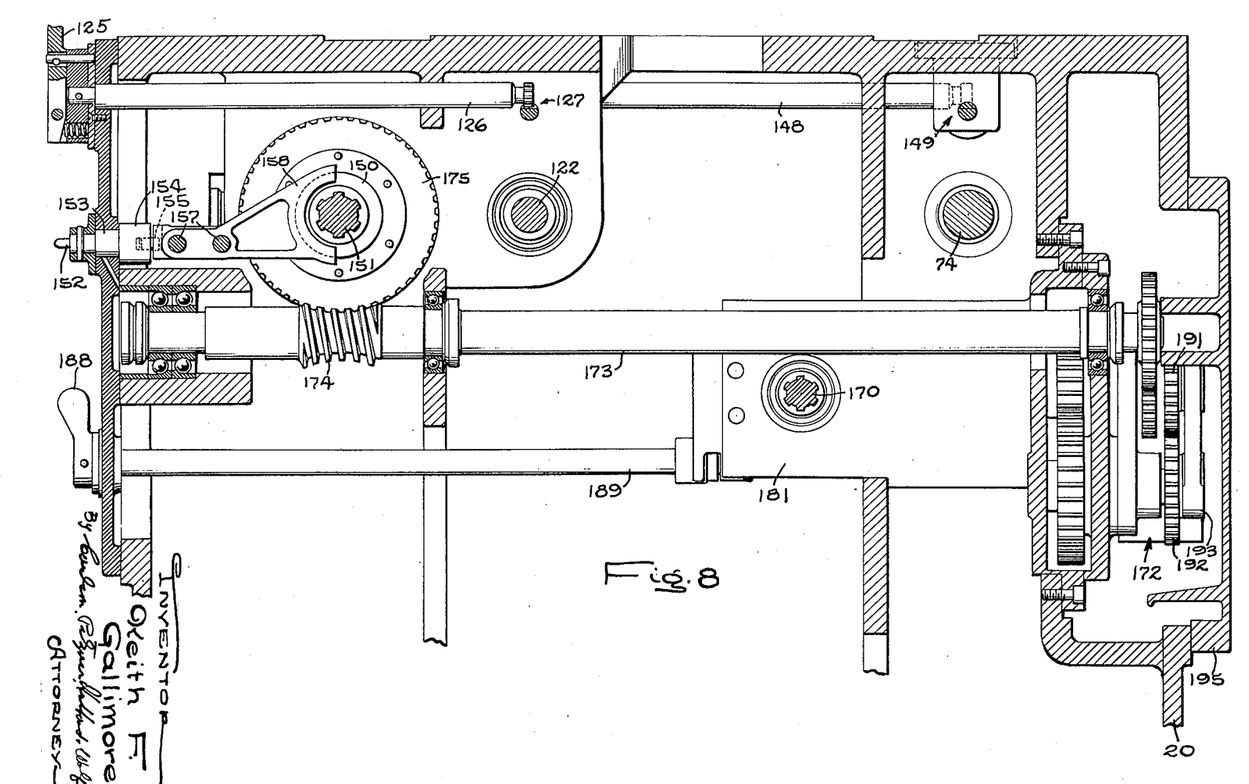
Fig. 8 is a sectional view of the machine bed taken in a plane substantially on the line 8—8 of Fig. 5, showing details of the thread cutting drive for the carriage.

The transmission 134 may be of any suitable character and as herein shown is a nine-speed transmission of the general type shown in the patent to K. F. Gallimore, No. 2,106,731, granted February 1, 1938. The transmission is adjusted for driving the shaft 134a at preselected speeds by rotation of an adjusting shaft 140 (Fig. 6). In the exemplary machine, such rotation of the adjusting shaft is effected by means of a hand crank 141 fast on the projecting end of a shaft 142 which extends through the tubular shaft 136 carrying the disk controller 135. The shaft 142 is provided on its inner end with a pinion 143 meshing with a gear 144 keyed to the adjusting shaft. A disk member 135a rotatably mounted on the shaft 142 and driven therefrom by gears 135b and 135c is provided with a suitable scale 145 (Fig. 1) for cooperation with the disk 135 to indicate the speed range for any setting of the two control elements.

The drive mechanism for the table 71 comprises a reversible electric motor $M^2$ flange-mounted on the end of the machine bed and a multiple speed transmission 146 which, in this instance, is coupled directly to the table drive shaft 74 extending along the machine bed. Adjustment of the transmission to regulate the speed of the shaft 74 or to disengage the driving motor therefrom is effected by a hand lever 147 carried by a rockshaft 148 having a rack-and-pinion connection 149 with the adjusting element of the transmission. The table may be traversed manually by application of a hand crank directly to the end of the table feed screw.

As explained heretofore, the saddle feed screw 46 is provided with individual driving mechanism for ordinary machining operations and provision is made for driving the feed screw from the spindle driving transmission 134 for thread cutting operations. The selective connection of these drive mechanisms to the feed screw is effected by a shiftable clutch member 150 in the form of a sleeve having a splined driving connection with a horizontally disposed shaft 151 axially alined with the feed screw and drivingly coupled therewith.

The clutch member is adapted to be shifted from a neutral position to either of two operative positions by means of a hand lever 152 mounted on the projecting end of a shaft 153 journaled on the front wall of the machine bed. The shaft 153 is provided on its inner end with a collar 154 having an eccentrically disposed pin 155 engaging in a slot in a shifter shoe 156 slidably supported by a pair of guide rails 157 within the gear box 26. A shifter arm 158 on the shoe cooperates with the clutch member to shift it longitudinally of the shaft 151 in response to the movements of the shoe.

The individual drive mechanism for the feed screw 46 comprises a multiple speed transmission 160 mounted in the gear box 26 and driven by a reversible electric motor $M^3$ flange-mounted on the end of the machine bed. The transmission drives a toothed clutch member 161 engageable by cooperating clutch teeth on the adjacent end of the clutch member 150 when the member is shifted toward the right end of the machine (downwardly as viewed in Figs. 5 and 18). Adjustment of the transmission is effected by a hand lever 162 carried on the projecting end of a rockshaft 163 having a rack-and-pinion connection 164 (Fig. 6) with the adjusting member of the transmission.

The thread cutting drive for the feed screw 46 includes a shaft 170 disposed parallel to the shaft 134a and driven in timed relation therewith by the spindle drive transmission 134. The shaft 170 is drivingly connected through a reversing clutch 171 and a pick off gear set 172 with a transverse shaft 173 which has a worm 174 coacting with a worm gear 175 mounted on the shaft 151. As shown in Fig. 5, the worm gear 175 is rotatably supported on the shaft 151 by antifriction bearings 176 and is provided at one end with clutch teeth 177 engageable with complemental clutch teeth formed on the shiftable clutch member 150. The arrangement is such that the worm gear 175 may be drivingly coupled to the feed screw drive shaft 151 by shifting the clutch member 150 toward the left end of the machine (upwardly as viewed in Fig. 6).

The reversing clutch 171 as shown in Fig. 5 comprises a shaft 180 journaled in a casing 181 within the gear box 26 and connected with the shaft 170 by a coupling 182. Loosely mounted on the shaft 180 within the casing are a pair of bevel gears 183 and 184 in constant mesh with opposite sides of a bevel gear 185 carried by a shaft 186 constituting, in this instance, the input shaft of the pick off gear set 172. A clutch member 187 in the form of a sleeve splined to the shaft 180 is shiftable axially thereon to establish a driving connection between the shaft 180 and either of the bevel gears 183 or 184 to determine the direction of rotation of the shaft 186.

For shifting the clutch member 187 there is a hand lever 188 located at the front of the machine and fixed on the end of a rockshaft 189 extending through the gear box 26 to the casing 181. At its inner end the shaft is operatively connected with a shifter element 190 operative to shift the clutch member from the neutral position in which it is shown in the drawing to either of two engaged positions with the gears 183 and 184 respectively.

The pick off gear set 172 is a conventional train of gears, including a pair of quick change gears 191 and 192, one of which is mounted on a sector element 193 which may be adjusted for the accommodation of gears of different sizes. The gears are enclosed in a chamber 193a formed in the rear wall of the machine bed 20 and closed by a removable cover plate 195. Thus the pick off gears are conveniently accessible so that the change gears 191 and 192 may be quickly and easily replaced by other gears to provide any desired driving ratio between the spindle speed and saddle feed.

In setting up the machine for boring, drilling or milling operations, the saddle feed screw clutch 150 is engaged for direct drive by the motor M³ and the transmission 160 and the latter is set to provide the desired speed range. The feeding rate of the saddle within that range is then adjusted by regulating the speed of the driving motor M³ which may be effected by a conventional motor speed controller. Similarly, the transmission 121 for the headstock elevator screw 24, the transmission 134, back gears 133 and gearing G for the spindle drive and the transmission 146 for the table drive are set for the desired speed ranges and the speeds and feeds are adjusted within such ranges by regulating the speeds of the associated driving motors M, M¹ and M². It will be understood, of course, that various machine elements may be operated individually or simultaneously as required for the particular machining operation to be performed.

When the machine is to be set up for thread cutting, the clutch 150 is disengaged from the individual feed screw driving mechanism and engaged with the worm wheel 175 which is driven from the spindle driving transmission 134. Change gears 191 and 192 of the sizes required to provide the proper driving ratio between the spindle 23 and the saddle feed screw 46 are placed in the pick off gear set 172 and the machine is then ready for operation. Due to the manner in which the feed screw and spindle drives are related, the driving ratio is maintained in the event that the spindle speed is changed during a thread cutting operation, thus maintaining the feed of the saddle coordinated with the rotation of the spindle at all times.

It will be apparent from the foregoing that the invention provides a machine tool of novel and advantageous construction. The improved machine tool is of the type commonly known as a horizontal boring, drilling and milling machine, but the extreme flexibility as regards feeds and speeds adapts it for a wider variety of machining operations than conventional machines of that type. Moreover, the machine is especially well suited for thread cutting operations which require accurate coordination of the feed rate with the spindle speed. The machine is of simple, rugged construction and rigid support is provided for each of the movable machine elements to insure precision machining of the work. Manual controls are provided for the feeds and speeds which are conveniently accessible to the machine attendant and which are arranged with a special view to facilitating the setting up of the machine for different operations.

I claim as my invention:

1. In a horizontal boring, drilling and milling machine, a headstock having a rotatable tool supporting spindle, a translatable work support, a feed screw for translating said work support, a first motor driven transmission for driving said feed screw, a second motor driven transmission for driving said spindle, and clutch means operable selectively to interrupt the driving connection between said first transmission and said feed screw and for establishing a driving connection between said second transmission and said feed screw.

2. In a horizontal boring, drilling and milling machine having a rotatable tool supporting spindle and a reciprocable work support, a pair of power actuated driving mechanisms each including a variable speed electric motor and a variable speed transmission, means providing a driving connection from one of said transmissions to said spindle, and means operable to provide a driving connection from either of said transmissions to said work selectively, said one transmission being operative to coordinate the feed of said work support with the rotation of said spindle for thread cutting.

3. In a horizontal boring, drilling and milling machine, a headstock having a rotatable tool supporting spindle, a support for work to be operated on by the tool carried by said spindle, a feed screw for translating said work support, a first motor driven transmission, a second motor driven transmission for driving said spindle, clutch means operable selectively to complete a driving connection from either transmission to said feed screw, and other clutch means in the driving connection from said second transmission for determining the direction of rotation of said feed screw.

4. In a machine tool having an elongated horizontal bed, an upright column adjacent one end of said bed, a saddle supported on said bed for reciprocation longitudinally of said bed, a table supported on said saddle for translation transversely of said bed, a headstock supported on said column for vertical adjustment, said headstock having a rotatably supported tool carrying spindle, a first motor driven means for reciprocating said saddle, a second motor driven means for translating said table, a third motor driven means for adjusting said headstock, a fourth motor driven means for rotating said spindle, and clutch means operable for disengaging said first motor driven means from said saddle and for engaging said fourth motor driven means to traverse said saddle in timed relation to the rotation of said spindle.

5. In a horizontal boring, drilling and milling machine, in combination, an elongated bed, a saddle supported at one end of the bed for reciprocation longitudinally thereof, an upright column at the other end of the bed, a headstock adjustably supported on said column, said headstock having a rotatable tool supporting spindle, means for driving said spindle including a motor mounted on the column end of said bed, a speed change transmission supported in said bed adjacent said motor and operatively connected thereto, a splined shaft driven by said transmission and extending upwardly along said column, means for reciprocating said saddle including a feed screw extending longitudinally of said bed, a second motor mounted on the column end of said bed, a second speed change transmission supported in said bed adjacent said second motor and operatively connected thereto, a shaft extending from said second transmission to said feed screw, a gear rotatably mounted on said shaft and adapted to be driven from said first transmission, and a shiftable clutch member operable to establish a driving connection between said shaft and said second transmission or to said gear selectively.

6. In a horizontal boring, drilling and milling machine, in combination, an elongated bed, a saddle supported at one end of the bed for reciprocation longitudinally thereof, an upright column at the other end of the bed, a headstock adjustably supported on said column, said headstock having a rotatable tool supporting spindle, means for driving said spindle including a motor mounted on the column end of said bed, a speed change transmission supported in said bed adjacent said motor and operatively connected thereto, a splined shaft driven by said speed change transmission and extending upwardly along said column, means for reciprocating said saddle including a feed screw extending longitudinally of said bed, a second motor mounted on the column end of said bed, a second speed change transmission supported in said bed adjacent said second motor and operatively connected thereto, said feed screw having an extension terminating adjacent said second transmission, a worm gear rotatably mounted on said feed screw extension, a shaft driven from said first transmission having a worm coacting with said gear to drive the same, and a shiftable clutch member mounted on said feed screw extension for connecting the extension with said second transmission or with said gear selectively.

7. In a horizontal boring, drilling and milling machine, in combiantion, an elongated bed, a carriage supported at one end of the bed for reciprocation longitudinally thereof, an upright column at the other end of the bed, a headstock adjustably supported on said column, said headstock having a rotatable tool supporting spindle, means for driving said spindle including a motor mounted on the column end of said bed, a speed change transmission supported in said bed adjacent said motor and operatively connected thereto, a splined shaft driven by said transmission and extending upwardly along said column to said headstock, means for reciprocating said carriage including a feed screw extending longitudinally of said bed, a second motor mounted on the column end of said bed, a second speed change transmission supported in said bed adjacent said second motor and operatively connected thereto, a member rotatably supported adjacent said feed screw, means including a set of pick-off gears providing a driving connection from said first transmission whereby said member is rotated in synchronism with said spindle, and a shiftable clutch member for connecting said feed screw to said second transmission or to said member selectively.

KEITH F. GALLIMORE.

REFERENCES CITED

The following references are of record in the file of this patent:

UNITED STATES PATENTS

| Number | Name | Date |
|---|---|---|
| 458,325 | Gifford | Aug. 25, 1891 |
| 983,225 | Grohmann | Jan. 31, 1911 |
| 1,749,073 | Graves | Mar. 4, 1930 |
| 1,840,051 | Nenninger | Jan. 5, 1932 |
| 1,853,795 | Armitage et al. | Apr. 12, 1932 |
| 1,955,954 | Dumser | Apr. 24, 1934 |
| 2,019,774 | Woytych | Nov. 5, 1935 |
| 2,345,060 | Morton | Mar. 28, 1944 |
| 2,387,820 | Armitage et al. | Oct. 30, 1945 |
| 2,438,235 | Strom | Mar. 23, 1948 |